US010644442B2

(12) United States Patent
Moseke et al.

(10) Patent No.: US 10,644,442 B2
(45) Date of Patent: May 5, 2020

(54) PLUG CONNECTOR PART WITH STRAIN RELIEF

(71) Applicant: Phoenix Contact E-Mobility GmbH, Schieder-Schwalenberg (DE)

(72) Inventors: Dirk Moseke, Hoexter-Luechtringen (DE); Marco Seelig, Leopoldshoehe (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 16/326,375

(22) PCT Filed: Sep. 6, 2017

(86) PCT No.: PCT/EP2017/072282
§ 371 (c)(1),
(2) Date: Feb. 20, 2019

(87) PCT Pub. No.: WO2018/046511
PCT Pub. Date: Mar. 15, 2018

(65) Prior Publication Data
US 2019/0221965 A1     Jul. 18, 2019

(30) Foreign Application Priority Data
Sep. 6, 2016  (LU) ........................................ 93198

(51) Int. Cl.
*H01R 13/59* (2006.01)
*B60L 53/16* (2019.01)
(Continued)

(52) U.S. Cl.
CPC .............. *H01R 13/59* (2013.01); *B60L 53/16* (2019.02); *B60L 53/18* (2019.02); *B60L 53/30* (2019.02);
(Continued)

(58) Field of Classification Search
CPC .............................. H01R 13/59; H01R 13/595
See application file for complete search history.

(56) References Cited

U.S. PATENT DOCUMENTS 3,796,504 A  *  3/1974  Marechal ............. H01R 4/5025
                                                    403/288
4,056,252 A     11/1977 Simon
(Continued)

FOREIGN PATENT DOCUMENTS

DE            2502050 A1     7/1976
DE       102012214685 A1     2/2013
(Continued)

*Primary Examiner* — Tho D Ta
(74) *Attorney, Agent, or Firm* — Leydig, Voit & Mayer, Ltd.

(57) ABSTRACT

A plug connector part for connecting to a mating plug connector part includes: a housing part on which a plug-in section for a plug-in connection to the mating plug-in connector part is arranged; at least one contact element arranged on the plug-in section so as to make electrical contact with an associated mating contact element of the mating connector part; an electrical line arranged on the housing part and electrically connected to the at least one contact element; a strain relief element movably arranged on the housing part; and an adjusting element that can be brought into operative connection with the strain relief element. Via actuation of the adjusting element, the strain relief element is movable into a position in which the strain relief element fixes the electrical line, relative to the housing part, in a tension-loadable manner.

14 Claims, 6 Drawing Sheets

(51) Int. Cl.
*B60L 53/18* (2019.01)
*B60L 53/30* (2019.01)
*H01R 13/58* (2006.01)
*H01R 13/627* (2006.01)
*H01R 13/629* (2006.01)
*H01R 13/595* (2006.01)

(52) U.S. Cl.
CPC ....... *H01R 13/5804* (2013.01); *H01R 13/629* (2013.01); *H01R 13/6275* (2013.01); *H01R 13/595* (2013.01)

(56) References Cited

U.S. PATENT DOCUMENTS

| | | | | |
|---|---|---|---|---|
| 4,775,122 A | * | 10/1988 | McClymont | H01R 13/595 174/665 |
| 5,021,006 A | * | 6/1991 | Fargeaud | H01R 13/595 439/469 |
| 5,346,406 A | | 9/1994 | Hoffman et al. | |
| 5,743,759 A | * | 4/1998 | Pudims | H01R 13/5205 439/462 |
| 6,123,573 A | * | 9/2000 | Savicki, Jr. | H01R 13/5812 439/466 |
| 6,739,900 B2 | * | 5/2004 | Mortun | H01R 13/5837 439/460 |
| 9,525,240 B2 | * | 12/2016 | Aue | H01R 13/648 |
| 2013/0052853 A1 | | 2/2013 | Natter et al. | |

FOREIGN PATENT DOCUMENTS

| | | | |
|---|---|---|---|
| EP | 1061611 A2 | 12/2000 | |
| GB | 2075278 A * | 11/1981 | ............. H01R 13/59 |
| WO | WO 03009428 A1 | 1/2003 | |

\* cited by examiner

PLUG CONNECTOR PART WITH STRAIN RELIEF

CROSS-REFERENCE TO PRIOR APPLICATIONS

This application is a U.S. National Phase application under 35 U.S.C. § 371 of International Application No. PCT/EP2017/072282, filed on Sep. 6, 2017, and claims benefit to Luxembourgian Patent Application No. LU93198, filed on Sep. 6, 2016. The International Application was published in German on Mar. 15, 2018 as WO 2018/046511 under PCT Article 21(2).

FIELD

The invention relates to a plug connector part for connecting to a mating plug connector part, and to a method for manufacturing a plug connector part.

BACKGROUND

Such a plug connector part comprises a housing part on which is arranged a plug-in section for plug-in connection to the mating plug connector part, and at least one contact element arranged on the plug-in section to make electrical contact with an associated mating contact element of the mating plug connector part. Additionally arranged on the housing part is an electrical line that is electrically connected to the at least one contact element.

Such a plug connector part may, in particular, be used as a charging plug or as a charging socket for charging an electrically-driven vehicle (also referred to as an electric vehicle). For example, in this instance, a cable is, on one side, connected to a charging station, and, on the other side, carries the plug connector part in the form of a charging plug that may be inserted into an associating mating plug connector part in the form of a charging socket at a vehicle, in order, in this way, to establish an electrical connection between the charging station and the vehicle.

In the production of such a plug connector part, the electrical line must be affixed to the housing part in such a way that tensile forces may be effectively absorbed and dissipated during operation. Particularly with a plug connector part in the form of a charging plug on a charging cable, it is to be avoided that the charging cable may detach from the charging plug in case of a tension on the charging cable.

Strain reliefs for the loadable fixing of an electrical line to a plug connector are known. Conventionally, for example, a clamping connection using a clip has been provided, by means of which an electrical line is affixed to a housing part so that said line can be loaded with tension. Alternatively, housing halves of a housing may be assembled in such a way that an electrical line is accommodated between the housing halves and in this way fixed in a clamping manner.

SUMMARY

In an embodiment, the present invention provides a plug connector part for connecting to a mating plug connector part, the plug connector part comprising: a housing part on which a plug-in section for a plug-in connection to the mating plug-in connector part is arranged; at least one contact element arranged on the plug-in section so as to make electrical contact with an associated mating contact element of the mating connector part; an electrical line arranged on the housing part and electrically connected to the at least one contact element; a strain relief element movably arranged on the housing part; and an adjusting element configured to be brought into operative connection with the strain relief element, wherein, via actuation of the adjusting element, the strain relief element is movable into a position in which the strain relief element fixes the electrical line, relative to the housing part, in a tension-loadable manner.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a plug connector part and a method for producing a plug connector part, which part and method may provide, in a simple, easily to install manner, a strain relief for connecting an electrical line to a housing part.

Accordingly, the plug connector part comprises a movably-arranged strain relief element on the housing part, and an adjusting element which can be operatively connected to the strain relief element, wherein, by actuating the adjusting element, the strain relief element can be moved into a position in which the strain relief element fixes the line, relative to the housing part, in a tension-loadable—and, advantageously, also torsion-loadable—manner.

Accordingly, a strain relief element is movably arranged on the housing part, which strain relief element may be adjusted between different positions using an adjusting element. In particular, after arranging the electrical line on the housing part, the strain relief element may be moved at the housing part in such a way that the strain relief element acts on the line and fixes it in a clamping manner to the housing part, so that tensile forces acting between the line and the housing part may be absorbed and dissipated.

The adjusting element, which may be formed by a screw, for example, is advantageously operable from outside of the housing part via a suitable tool—for example, a screwdriver. For example, by rotating the adjusting element, the strain relief element may thus be moved in the housing part in order to bring the strain relief element into engagement with the electrical line, and, for example, to produce a clamping connection between the line and the housing part.

If the adjusting element is realized by a screw, the adjusting element may be brought into threaded engagement with the strain relief element so that the strain relief element may be moved to the housing part by rotating the adjusting element. The adjusting element thereby engages with the strain relief element at one end and is supported at its other end with respect to the housing part, so that the strain relief element may be moved, relative to the housing part, by rotating the adjusting element.

It may thereby be provided that the strain relief element, in the assembly of the plug connector part, be inserted into the housing part, in order to bring the adjusting element into threaded engagement with the strain relief element after placement of the electrical line at the housing part, and to adjust it in such a way that the electrical line is fixed to the housing part.

In order to enable a threaded engagement between the strain relief element and the adjusting element, the strain relief element advantageously has a threaded element with which the adjusting element, for movement of the strain relief element, can be brought into a threaded engagement. The threaded element may, for example, be realized by a nut which is inserted so as to be rotationally fixed into an insertion opening of the strain relief element, and which has an internal thread which can be brought into threaded engagement with the adjusting element. The contour of the insertion opening is adapted to the external contours of the nut so that the, for example, hexagonal nut cannot be rotated in the insertion opening, and is thus fixed at the tension relief element in a rotationally-fixed manner.

The strain relief element is movably arranged on the housing part. The strain relief element may thereby be movable in different ways. For example, the strain relief element may be arranged on the housing part so as to be displaceable or pivotable.

In one embodiment, the strain relief element is guided on a guide device of the housing part so as to be displaceable. The guide device may, for example, be formed by a guide groove in which the strain relief element slides. By moving along the guide device, the strain relief element may be transferred from a first position, in which the strain relief element is not attached to the line in a clamping manner, into a second position in which the strain relief element acts on the line and thus fixes the line in a clamping manner in the housing part.

The guide device may specify a straight, longitudinally-extended guideway for the strain relief element. However, it is also conceivable and possible that the guide device defines a curved guideway along which the strain relief element can be moved.

In a concrete embodiment, the guide device guides the strain relief element lengthwise along a clamping direction on the housing part, wherein the clamping direction is, for example, directed in parallel to a longitudinal direction along which the line is inserted into the housing part.

In one embodiment, the strain relief element may have a wedge shape, for example. By moving the strain relief element from the first position in the direction of the second, clamping position, the strain relief element may thus be brought into contact with the electrical line on the housing part, wherein an advantageous clamping force for fixing the line to the housing part is produced, due to the wedge shape of the strain relief element.

The strain relief element preferably has a clamping surface which, for jamming, may be brought into contact with the line. The wedge shape of the strain relief element may, for example, result from the clamping surface describing an (acute) angle relative to the clamping direction along which the strain relief element can be moved on the housing part.

In order to be able to advantageously absorb tensile forces on the strain relief element, in one embodiment, on the clamping surface, one or more contour elements may be provided which project from the clamping surface and can be brought into contact with the line in such a way that tensile forces acting on the line may be effectively absorbed and dissipated. For example, such contour elements may have the shape of mandrels, of webs extending transversally to the clamping direction, or even the form of a toothing. By means of one or more contour elements, the engagement of the strain relief element with the line may thus be improved, and a firm frictional connection may be achieved between the electrical line and the housing part or the strain relief element arranged on the housing part.

By means of the strain relief element and the thereby adjusted clamping connection with the housing part, the electrical line is fixed to the housing part such that tensile forces that act between the electrical line and the housing part may be absorbed and dissipated. In one embodiment, in addition to this, a toothed segment may be formed at the housing part, which toothed segment is connected to the line, if the line is arranged on the housing part. The toothing of the toothed segment may, for example, thereby be directed such that torsion forces that act on the line may be absorbed and dissipated via the toothed segment, such that the electrical line cannot be rotated, relative to the housing part. The torques introduced by the line, in particular, are absorbed by the toothing.

This toothing segment may, for example, be formed at the edge of an opening through which the line extends into the housing part.

The aim is also achieved via a method for producing a plug connector part for connection to a mating plug connector part. In the method, a strain relief element is movably arranged on a housing part, an electrical line is arranged on the housing part, wherein the electrical line will be or already is connected to at least one contact element to make electrical contact with an associated mating contact element of the mating plug connector part, an adjusting element is brought into operative connection with the strain relief element, and the adjusting element is actuated in order to move the strain relief element into a position in which the strain relief element fixes the line, relative to the housing part, in a tension-loadable manner.

The method, with its steps, does not necessarily need to be implemented in the indicated order; rather, the steps may also be executed in a different order.

If arranged on the housing part, the electrical line may already be connected to the contact elements of the plug connector part and may be arranged together with the contact elements on the housing part. However, it is also conceivable that the contact elements be arranged on the housing part in advance, and the line be connected to the contact elements upon being placed on the housing part.

The advantages and advantageous embodiments described in the preceding for the plug connector part also apply analogously to the method, such that the preceding statements are to be referenced.

In one embodiment, the strain relief element is, in particular, guided on a guide device of the housing part so as to be displaceable, if it is attached to said housing part. By actuating the adjusting element, the strain relief element may then be moved along the guide device in order, in this way, to bring the strain relief element into contact with the line and to fix the line (clamping) to the housing part.

Figure 1:
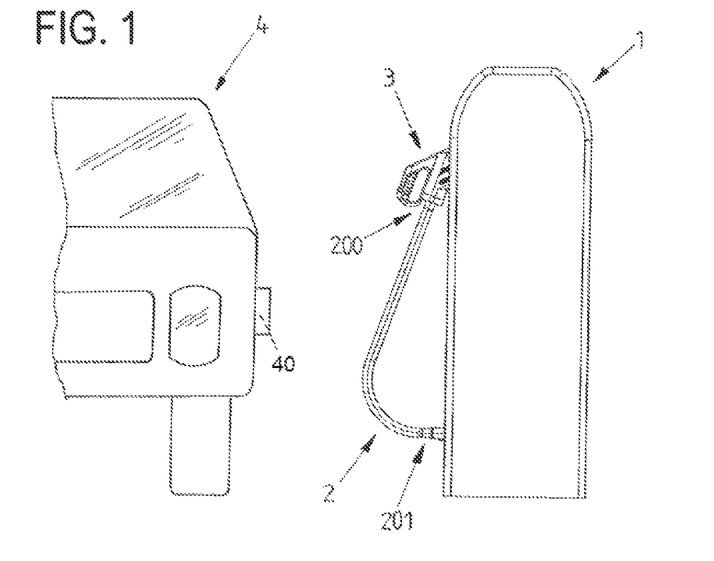
FIG. 1 a view of a charging system for charging an electric vehicle.

FIG. 1 shows a charging station 1 that serves for charging an electrically-driven vehicle 4—also referred to as an electric vehicle. For this, the charging station 1 is designed to provide a charging current in the form of an alternating current or a direct current, and has a cable 2 that is connected to the charging station 1 at one end 201 and to a plug connector part 3, in the form of a charging plug, at another end 200.

Figure 2:
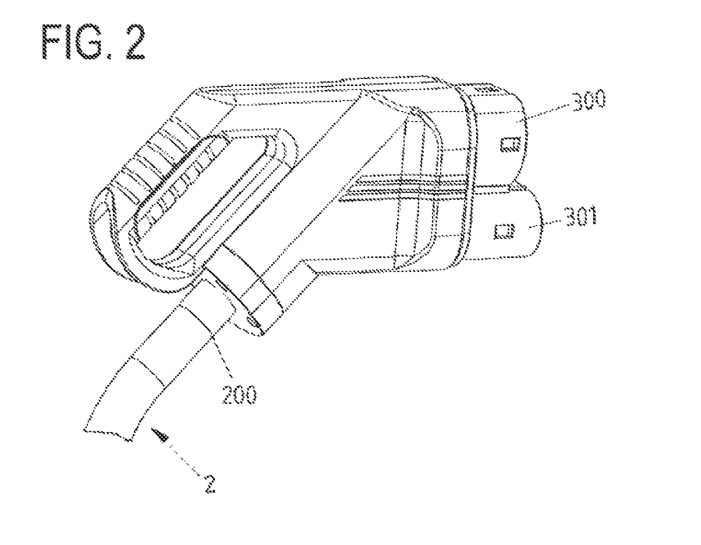
FIG. 2 a view of a plug connector part in the form of a charging plug.

As is apparent from the enlarged view according to FIG. 2, at a housing 30, the plug connector part 3 has plug-in sections 300, 301 with which the plug connector part 3 may be brought into plugged engagement with an associated mating plug connector part 40 in the form of a charging socket at the vehicle 4. In this way, the charging station 1 may be electrically connected to the vehicle 4 in order to transmit charging currents from the charging station 1 to the vehicle 4.

In order to enable a rapid charging of the electric vehicle 4, e.g., in the context of what is known as a rapid charging process, the transferred charging currents may have a high amperage—for example, greater than 200 A, and possibly even on the order of 350 A or more.

Figure 3:
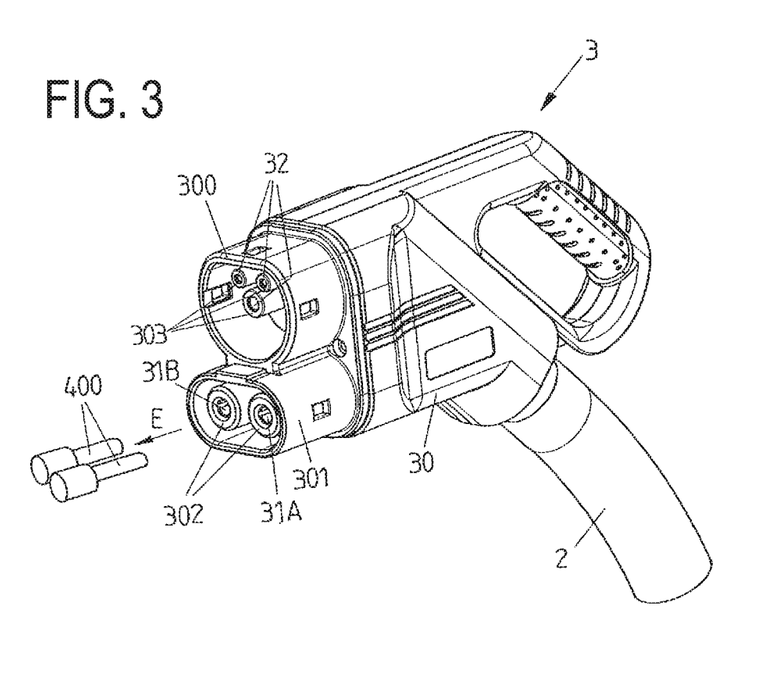
FIG. 3 a different perspectival view of the plug connector part.

As is apparent from FIG. 3, the plug connector part 3 has several contact elements 31A, 31B, 32 at its plug-in sections 300, 301. Contact elements 31A, 31B, which serve to transmit a charging current in the form of a direct current, are thus arranged on a lower plug-in section 301 within two plug pins 302, whereas contact elements 32 for providing a grounded PE contact and signal contacts for transmitting control signals are arranged on the plug-in section 300.

As is schematically depicted in FIG. 3, the contact elements 31A, 31B on the plug-in section 301 of the plug connector part 3 may be brought into engagement in an insertion direction E with mating contact elements 400 in the form of contact pins on the side of the charging socket 40, in order to electrically contact the contact elements 31A, 31B with the mating contact elements 400. Load lines are guided in the cable 2 that serve to transmit a charging current to the plug connector part 3 and are connected to the contact elements 31A, 31B.

In mounting the plug connector part 3, the electrical line 2 is to be fixed to the housing 30 in such a way that, given later use of the plug connector part 3, tensile forces which attack the line 2 may be effectively absorbed and dissipated. In particular, tensile forces acting between the line 2 and the plug connector part 3 may not lead to the situation that the line 2 detaches from the plug connector part 3, and the load lines of the electrical line 2 lose their contact with the contact elements 31A, 31B, 32.

In order to provide a simple, loadable strain relief that is easy to manufacture, in an exemplary embodiment of a plug connector part 3 as depicted in FIGS. 4 through 11, a strain relief element 34 is provided that is directed in a guide device 333 in the form of a guide groove to a housing part 33 of the housing 30 and is movable at the housing part 33, in order to produce a clamped connection between the line 2 and the housing part 33. By means of the strain relief element 34, a strain relief may thus be provided, which fixes the line 2 to the housing part 33 in a load-bearing manner and thereby can be easily operated.

Figure 4:
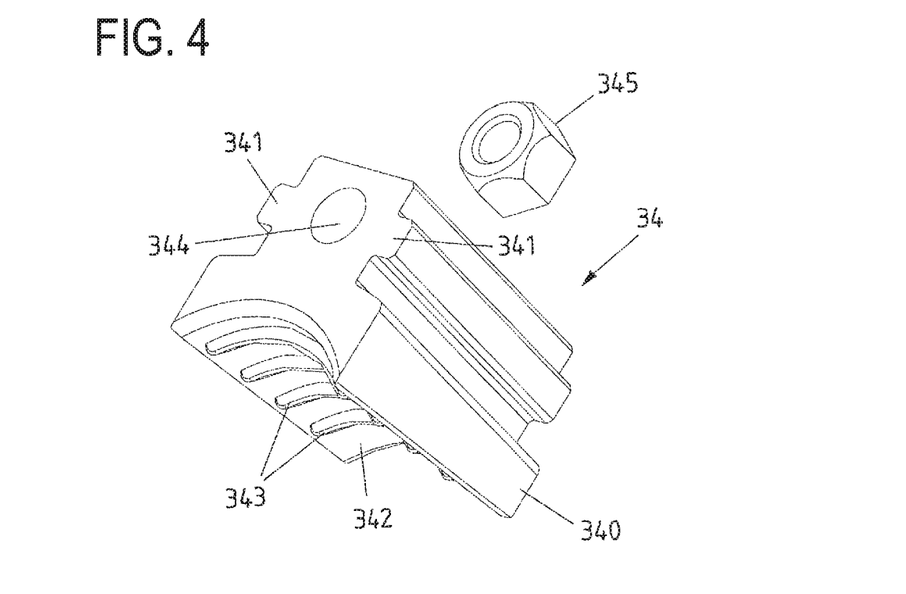
FIG. 4 a view of a strain relief element.
Figures 5A, 5B:
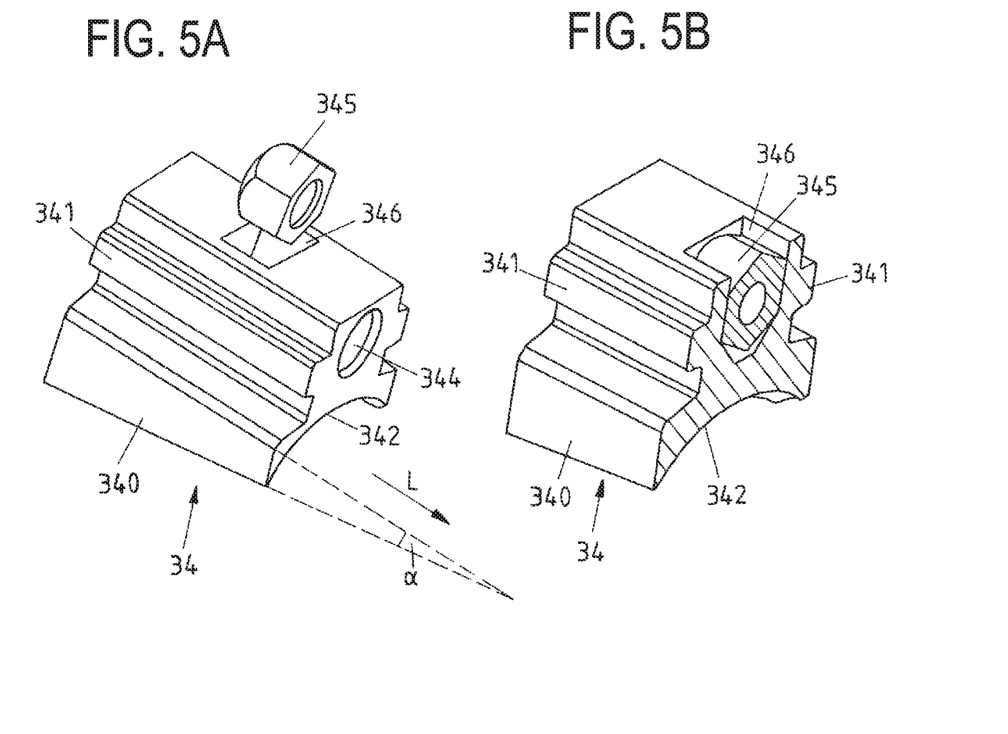
FIG. 5A a different view of the strain relief element.
FIG. 5B a partial section view of the strain relief member with an inserted threaded element in the form of a nut.

The strain relief element 34, which is shown in separate illustrations in FIGS. 4 and 5A, 5B, has a body 340 and longitudinally-extending webs 341 formed thereon, with which the strain relief element 34 may be inserted into the guide device 333 in the form of the guide groove at the housing part 33. In the guide device 333, the strain relief element 34 is guided longitudinally along a clamping direction K and may be moved in order to bring the strain relief element 34 into contact with a line 2 inserted into the housing part 33.

On a side facing away from the webs 341, the strain relief element 34 has a clamping surface 342 that is curved so as to be complementary to the (cylindrical) line 2 and on which are arranged contour elements 343 in the form of projecting, transversally-extending webs. Via the clamping surface 342, the strain relief element 34 may be brought into contact with the line 2 in order to clamp the line 2 in the housing part 33.

A passage opening 344 through which a tool 5 (see FIGS. 10 and 11) may engage in the strain relief element 34 is formed in the body 340. An insertion opening 346 is thereby formed centrally on the body 340 on a side facing away from the clamping surface 342, into which insertion opening 346 a threaded element 345 in the form of a nut can be inserted, and in which the threaded element 345 is held in a rotationally-fixed manner. In particular, the contour of the insertion opening 346 is adapted to the (hexagonal) exterior contours of the nut realizing the threaded element 345, so that the threaded element 345 cannot be rotated in the insertion opening 346 (see, in particular, FIG. 5B).

As shown schematically in FIG. 5A, the clamping surface 342 describes an (acute) angle a relative to the clamping direction K along which the strain relief element 34 can be moved in the guide device 333, and is thereby inclined relative to the clamping direction K in such a way that a wedge shape results. Given movement of the strain relief element 34 in the clamping direction K (i.e., towards the line 2), the clamping surface 342 thus travels on the line 2 and causes the line 2 to become jammed with the housing part 33, as will be further described below.

Figure 6:
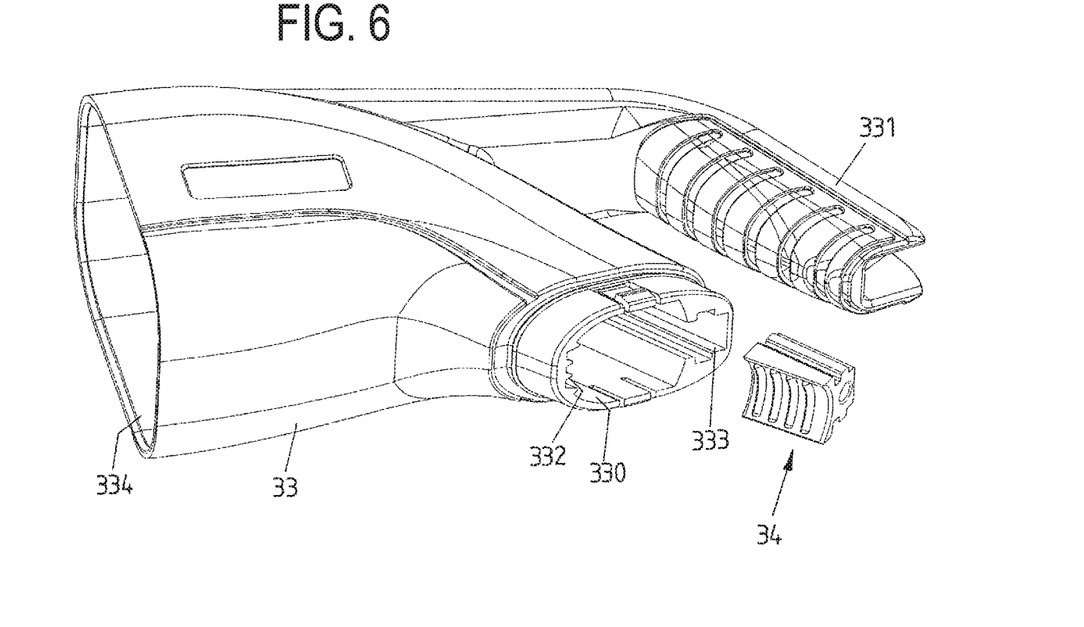
FIG. 6 a view of a housing part of the plug connector part, before attachment of the strain relief element.

For mounting the connector part 3, as shown in FIG. 6, the strain relief element 34 is first inserted into the guide device 333 in the form of the guide groove within the housing part 33. For this purpose, the strain relief element 34 is introduced via an opening 330 of the housing part 33 into the guide device 333, and is inserted into the guide device 333 up to an end position, as this is depicted in the partially cut-away view according to FIG. 7. At the end position, the strain relief element 34 may be locked, e.g., via a latching cam, so that the strain relief element 34 does not move back during assembly without taking further measures, and, in particular, cannot fall out of the guide device 333.

Figure 7:
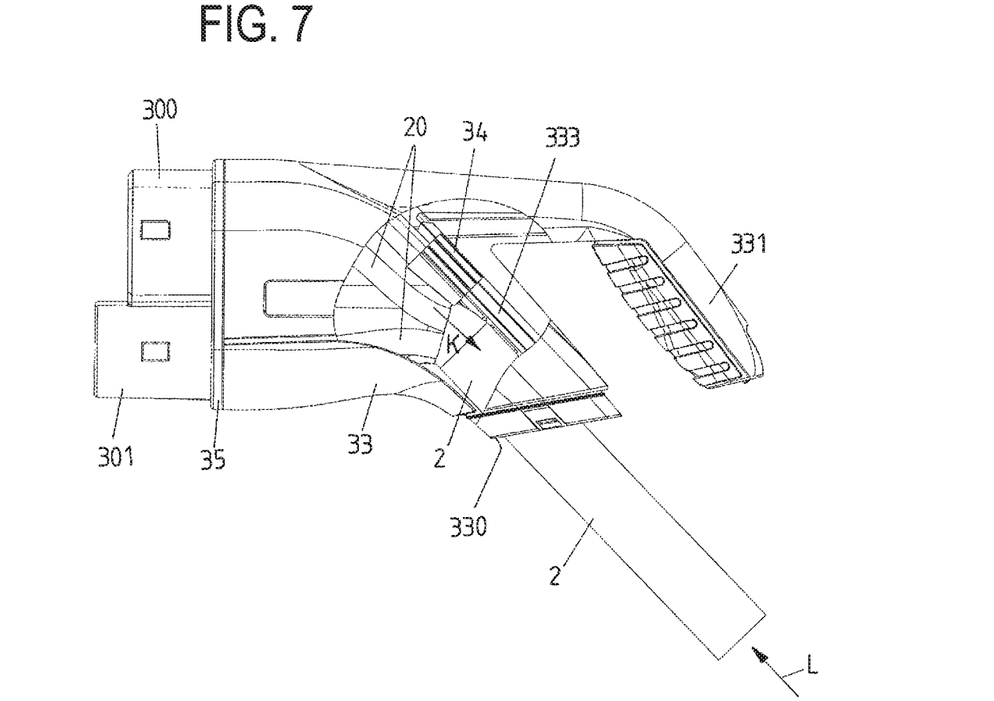
FIG. 7 a view of the plug connector part, having plug-in sections arranged on the housing portion, and an electrical line.

After insertion of the strain relief element 34 into the guide device 33, a front housing part 35 with the plug-in sections 300, 301 formed thereon is attached at an opening 334 of the housing part 33. This takes place while the electrical line 2 is already connected via load lines 20 to the contact elements 31A, 31B, 32 arranged at the plug-in sections 300, 301. The housing part 35 having the plug-in sections 300, 301 is thus attached to the housing part 33 together with the line 2.

If the line 2 is attached to the housing part 33, the line 2 thus extends through the opening 330 to the end of the housing part 33 that faces away from the plug-in sections 300, 301, as is apparent from FIG. 7. The line 2 thereby extends along a longitudinal direction L into the housing part 33, and is connected within the housing part 33 via its load lines 20 to the contact elements 31A, 31B, 32 at the plug-in sections 300, 301.

Figure 8:
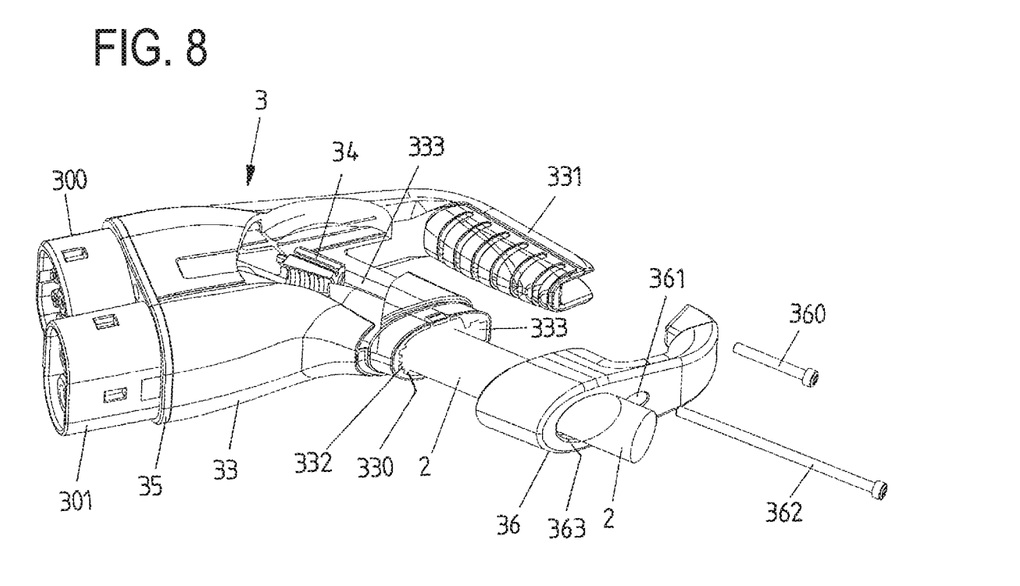
FIG. 8 a view of the plug connector part before the attachment of an additional housing part for fixing the electrical line.
Figure 9:
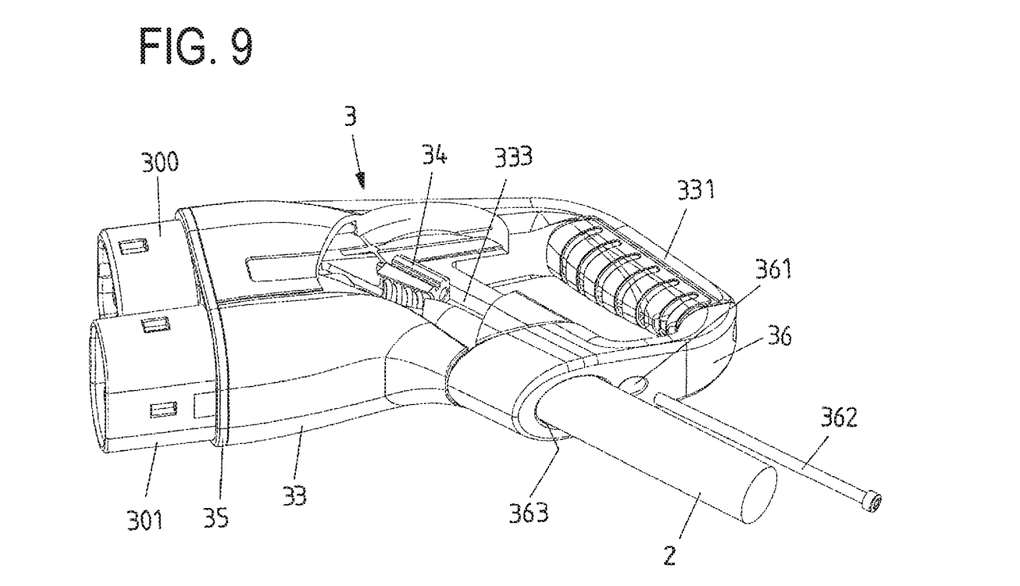
FIG. 9 a view of the plug connector part before attachment of an adjusting element for movement of the strain relief element.

In the next step, as depicted in FIGS. 8 and 9, an additional, rear housing part 36 is now attached to the housing part 33 such that the additional housing part 36 covers the opening 330 of the housing part 33 and provides a connection for a handle segment 331 formed at the housing part 33, such that a closed handle that can be manually gripped by a user is formed.

An opening 363 through which the line 2 extends is formed in the additional, rear housing part 36. The further housing part 36 is connected to the handle segment 331 of the housing part 33 via an attachment element 360 in the form of a screw, and has an opening 361 via which an adjusting element 362 in the form of an adjusting screw is introduced into the housing part 33 and may be brought into engagement with the strain relief element 34.

Figure 10:
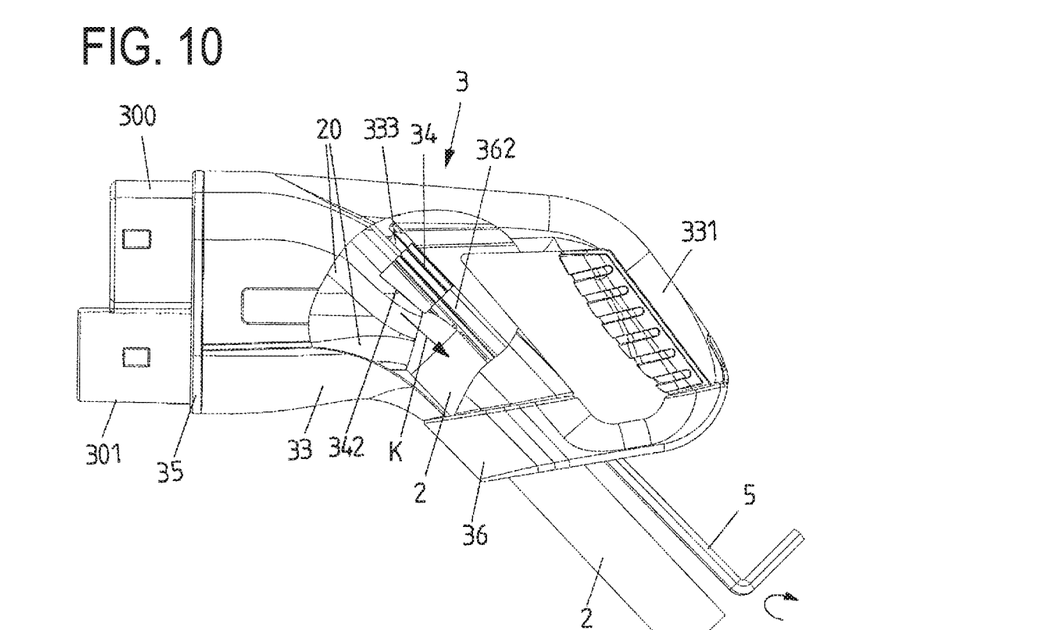
FIG. 10 a view of the plug connector part upon actuation of the adjusting element by means of a tool for movement of the strain relief element.
Figure 11:
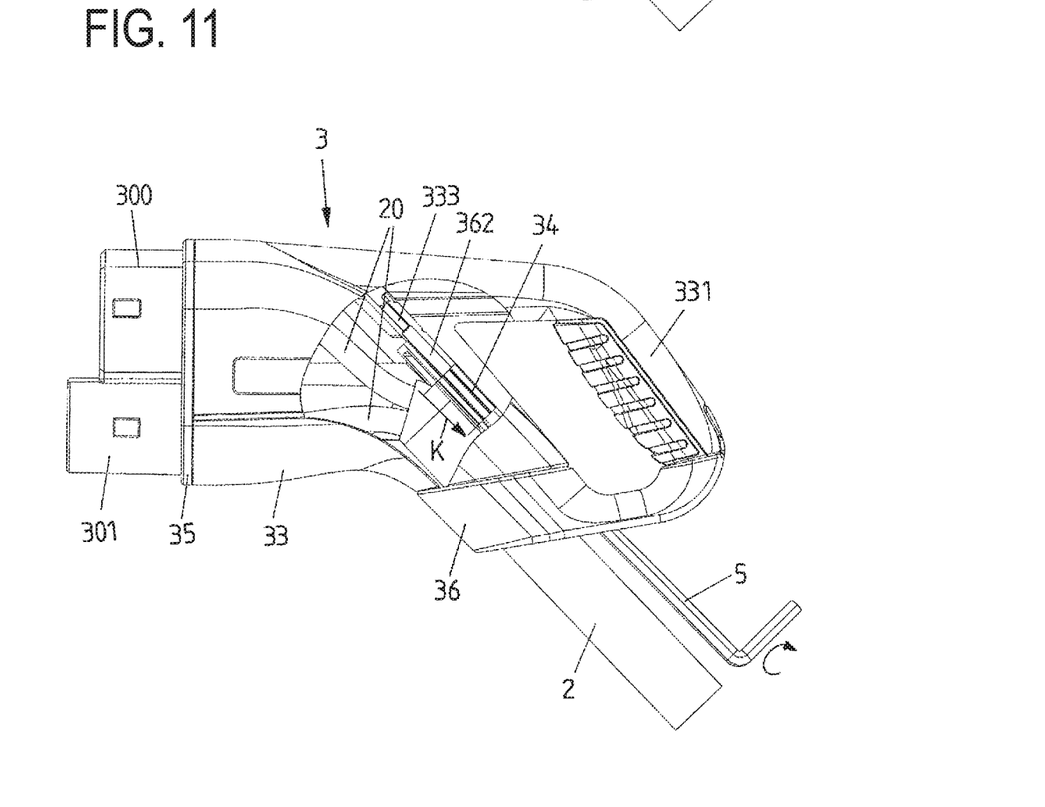
FIG. 11 a view of the plug connector part, with the strain relief element in a position in which the electrical line is fixed on the housing part in a tension-loadable manner.

This is depicted in FIGS. 10 and 11. Because the adjusting element 362 is placed through the opening 361 into the additional housing part 36, the adjusting element 362 engages with the passage opening 344 at the body 340 of the strain relief element 34. If, as shown in FIGS. 10 and 11, the adjusting element 362 is rotated using a tool 5 in the form of a screwdriver, the adjusting element 362 enters into a threaded engagement with the threaded element 345 in the form of a nut at the strain relief element 34, so that said strain relief element 34 is moved in the clamping direction K, and, with its clamping surface 342, approaches the line 2 inside the housing part 33.

The adjusting element 362 is supported with its head at the housing part 36 and may be rotated in the opening 361 of the housing part 36. By rotating the adjusting element 362, the strain relief element 34 is thus pulled in the clamping direction K, in the direction of the housing part 36, and is thereby brought into clamping contact with the line 2.

The clamping direction K is thereby oriented in parallel to the longitudinal direction L. By adjusting the strain relief element 34, the strain relief element 34 is thus pushed on the line 2 in the clamping direction K, and, in this way, the line 2 is jammed within the housing part 33.

By means of the strain relief element 34, the electrical line 2 is thus jammed within the housing part 33 so that a frictional connection is produced, and, in this way, the line 2 is fixed in the housing part 33 such that tensile forces acting between the line 2 and the plug connector part 3 cannot lead to a detachment of the line 2 from the housing part 33.

FIG. 11 shows the strain relief element 34 in its clamping position. In this clamping position, the clamping surface 342 is in pressing contact with the electrical line 2, and the electrical line 2 is thereby jammed with the housing part 33.

Tensile forces may, particularly advantageously, be absorbed and dissipated by the contour elements 343 formed on the clamping surface 342. In particular, the contour elements 343 that, for example, exhibit a teeth-like form may dig into the outer cladding of the line 2, so that the frictional connection acting between the line 2 and the housing part 33 is assisted by a positive fit.

As is apparent from, for example, FIG. 8, a toothed section 332 is formed at the edge surrounding the opening 330 of the housing part 33, with which toothed section 332 the line 2 is in contact if the line 2 is fixed in the housing part 33 due to the effect of the strain relief element 34. This toothed section 332 exhibits a toothing with teeth directed along the longitudinal direction L, such that torsion forces may be absorbed via this toothed section 332, and thus the line 2 cannot (without further measures) be rotated, relative to the housing part 33.

After the establishment of the clamping connection, the tool 5 may be removed from the plug connector part 3.

The idea underlying the invention is not limited to the exemplary embodiments described above.

In particular, a strain relief of the described type is in principle also usable in plug connector parts of an entirely different nature. The plug connector part, depicted in the exemplary embodiment in the form of a charging plug, is in this respect to be understood merely as an example. In particular, such a strain relief may also be used in a plug connector in the form of a charging socket, or in plug connectors outside of charging systems for charging an electric vehicle.

The described strain relief enables a durable, loadable fixing of an electrical line to a housing part of a plug connector part. The strain relief is thereby simple to produce and simple to operate, and independent of possible tolerances—for example, of the housing.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

1 Charging station
2 Electrical line (charging cable)
20 Cable wires
200, 201 End
3 Charging plug
30 Housing 300, 301 Plug-in section
302, 303 Plug pins
31A, 31B Contact element
32 Contact element
33 Housing part
330 Opening
331 Handle section
332 Toothed section
333 Guide groove
334 Opening
34 Strain relief element (wedge element)
340 Body
341 Guide web
342 Clamping surface
343 Contour elements
344 Passage opening
345 Threaded element (nut)
346 Insertion opening
35 Front housing part
36 Rear housing part
360 Fastening element
361 Opening
362 Adjusting element
363 Opening
4 Vehicle
40 Charging socket
400 Mating contact element
5 Tool
E Insertion direction
K Clamping direction
L Longitudinal direction

The invention claimed is:

1. A plug connector part for connecting to a mating plug connector part, the plug connector part comprising:
 a housing part on which a plug-in section for a plug-in connection to the mating plug connector part is arranged;
 at least one contact element arranged on the plug-in section so as to make electrical contact with an associated mating contact element of the mating plug connector part;
 an electrical line arranged on the housing part and electrically connected to the at least one contact element;
 a strain relief element movably arranged on the housing part; and an adjusting element configured to be brought into operative connection with the strain relief element,
 wherein, via actuation of the adjusting element, the strain relief element is movable into a position in which the strain relief element fixes the electrical line, relative to the housing part, in a tension-loadable manner, and
 wherein a body of the strain relief element has a wedge shape along a longitudinal direction of the strain relief element.

2. The plug connector part according to claim 1, wherein the adjusting element is actuatable by a tool from outside of the housing part.

3. The plug connector part according to claim 1, wherein the adjusting element comprises a screw which is configured to be brought into threaded engagement with the strain relief element and to be rotated in order to move the strain relief element, relative to the housing part.

4. The plug connector part according to claim 1, wherein the strain relief element has a threaded element with which the adjusting element, for moving the strain relief element, is configured to be brought into threaded engagement.

5. The plug connector part according to claim 4, wherein the threaded element comprises a nut arranged in a rotationally-fixed manner in an insertion opening of the strain relief element.

6. The plug connector part according to claim 1, wherein the strain relief element is guided on a guide device of the housing part so as to be displaceable.

7. The plug connector part according to claim 6, wherein the guide device is configured to guide the strain relief element longitudinally along a clamping direction at the housing part.

8. The plug connector part according to claim 7, wherein the clamping direction is directed in parallel to a longitudinal direction along which the electrical line is to be introduced into the housing part.

9. The plug connector part according to claim 1, wherein the strain relief element has a clamping surface which, for jamming, is configured to be brought into contact with the electrical line.

10. The plug connector part according to claim 9, wherein, at the clamping surface, at least one of the contour elements projecting from the clamping surface is configured to fix the electrical line to the housing part in a tension-loadable manner.

11. The plug connector part according to claim 1, wherein at least one toothed section is formed at the housing part, which toothed section is in contact with the electrical line when the electrical line is arranged at the housing part.

12. The plug connector part according to claim 11, wherein the toothed section is formed at an edge of an opening through which the electrical line extends into the housing part.

13. A method for producing a connector part for connecting to a mating plug connector part, the method comprising:
 arranging a strain relief element movably on a housing part;
 arranging an electrical line on the housing part, the electrical line being connectable to at least one contact element to make electrical contact with an associated mating contact element of the mating plug connector part;
 bringing an adjusting element into operative connection with the strain relief element; and
 actuating the adjusting element in order to move the strain relief element into a position in which the strain relief element fixes the electrical line, relative to the housing part, in a tension-loadable manner,
 wherein a body of the strain relief element has a wedge shape along a longitudinal direction of the strain relief element.

14. The method according to claim 13, wherein the strain relief element is guided on a guide device of the housing part so as to be displaceable, and is moved along the guide device via actuation of the adjusting element.

* * * * *